United States Patent [19]

Battarel et al.

[11] 4,403,138

[45] Sep. 6, 1983

[54] HEAT-DESTRUCTIBLE MAGNETIC MEMORY ELEMENT

[75] Inventors: Claude Battarel, Magagnosc; Brigitte Bedene, Nice; Robert Morille, Saint-Paul-de-Vence, all of France

[73] Assignee: Crouzet, France

[21] Appl. No.: 263,926

[22] Filed: May 15, 1981

[30] Foreign Application Priority Data

May 21, 1980 [FR] France ................................ 80 11320

[51] Int. Cl.³ ............................................ G06K 19/06
[52] U.S. Cl. .................................... 235/493; 235/488; 235/187; 235/492; 365/173
[58] Field of Search ............... 235/493, 488, 492, 487; 365/173

[56] References Cited

U.S. PATENT DOCUMENTS

| Re. 28,701 | 1/1976 | Edwards et al. | 235/61.7 B |
| 3,480,929 | 11/1969 | Bergman | 340/174 |
| 4,158,434 | 6/1979 | Peterson | 238/382 |

FOREIGN PATENT DOCUMENTS 1166085 10/1969 United Kingdom .

Primary Examiner—G. Z. Rubinson
Assistant Examiner—Robert Lev
Attorney, Agent, or Firm—Jacobs & Jacobs

[57] ABSTRACT

Magnetic memory element for transport ticket or credit card, comprising a support and at least one ferromagnetic layer containing at least one piece of information recorded therein and a layer of a non-magnetic diffuser in contact with the ferromagnetic layer to irreversibly destroy the magnetism of the ferromagnetic layer when the element is heated.

7 Claims, 2 Drawing Figures

HEAT-DESTRUCTIBLE MAGNETIC MEMORY ELEMENT

BACKGROUND OF THE INVENTION

The present invention relates to a magnetic memory element, comprising a support and at least one ferromagnetic layer containing at least one piece of information.

Tickets or cards are already known, serving as supports for ferromagnetic zones deposited or glued on their surface, and of which the magnetization constitutes the information associated with these supports. For example, such supports may be travel tickets and credit cards. The information zones in question are formed by deposits of ferrite, of the magnetic ink type, with discontinuous magnetization produced by a read-in head. Discontinuous magnetization of the information zones may result in a magnetization in one direction in one zone and a magnetization in the other direction in another adjacent zone, these two opposite-direction magnetizations creating a magnetic transition constituting a bit of information. This discontinuous magnetization may also result in any magnetization in spaced-apart ferromagnetic zones, defining magnetic dipoles. The magnetic information is intended to be exploited, in a magnetic reader, by a read-out head and an eraser coil.

In view of the generalisation of magnetic recording in all its forms, such information supports, or magnetic memory elements, are no longer protected from fraud, since it is possible to read out the information of a valid support and reproduce it on a expired support to validate it again.

SUMMARY OF THE INVENTION

It is an object of the present invention to avoid such frauds.

To this end, the present invention relates to a magnetic memory element, comprising a support and at least one ferromagnetic layer containing at least one piece of information, and one layer of a non-magnetic diffuser for irreversibly destroying the magnetism of the ferromagnetic layer under the action of heat. This "destruction" is thus an irreversible demagnetization.

Due to the irreversible destruction of the magnetism of the ferromagnetic layer, particularly for erasing the information of the memory element of the invention, this layer may become unusable with the disappearance of the information without ever being able to be used by defrauders. In the case of the ferromagnetic layer containing several pieces of information, the latter may in the same way disappear one by one, without ever being reproducible.

In a preferred embodiment of the invention, the means for destroying the magnetism comprises at least one layer of a non-magnetic diffuser in contact with the ferromagnetic layer, which is operable to destroy the magnetism of the ferromagnetic layer under the action of heat.

The phenomenon of destruction of the magnetism of a ferromagnetic layer by a diffuser is explained as follows:

The contact of two materials provokes the migration, and therefore the diffusion, of the atoms of each material into the other. The speed of diffusion of the atoms of one diffuser is, however, much greater than that of the atoms of another material.

In the energy band 3d of ferromagnetic bodies, there are a number of electrons with spin oriented in one direction different from the number of electrons with spin oriented in the other direction. This is ferromagnetism. The electrons of the atoms of a diffuser, upon diffusion, partially fill this energy band of the ferromagnetic body and re-establish the spin equilibrium, thus partially destroying the ferromagnetism. This destruction of the ferromagnetism is irreversible. That is, after the diffusion into an area of the ferromagnetic material, that area remains non-ferrogmagnetic.

The more a diffuser has peripheral electrons at a certain level of energy, the more it is effective.

Suitable diffusers include indium or bismuth, which are pure metals. However, the invention is not limited thereto, and a metalloid or even any other body may also be suitable, provided that it is not ferromagnetic. Materials with low melting points are prepared for the diffuser. In this respect, the melting point of indium is 156° C.

Preferably, the ferromagnetic layer is a thin layer.

In fact, as, in practice, there is a temperature limit for the heating, the time necessary for destroying the magnetism of the ferromagnetic layer by heating decreases as the thickness of the ferromagnetic layer decreases.

In addition, it should be observed that this magnetism, at a given temperature, degraded regularly and in predetermined manner with time. It is therefore possible, for each temperature, to determine the time necessary for attaining this degradation on and consequently to know the life duration of the memory element of the invention, at ambient temperature.

Furthermore, it is advantageous if the concentration of the diffuser in the ferromagnetic layer ensuring destruction of its magnetism is lower than the concentration corresponding to the limit of solubility of the diffuser in the ferromagnetic layer.

In other words, the limit of solubility of the diffuser in the ferromagnetic material must preferably be attained only after the destruction of the magnetism. However, we should emphasize that this is merely a preferred embodiment.

It has been seen hereinabove that the thinner the ferromagnetic layer, the greater is the speed of destruction of the magnetism, under the action of heat. Now, the level of the read-out signal of a magnetic memory element picked up by a read-out head, is a function of the flux, which is itself the greater as the ferromagnetic layer is thick. This is why, in a particularly preferred embodiment of the invention, the memory element comprises a plurality of thin ferromagnetic layers and a plurality of layers of diffuser intercalated between one another, respectively.

Due to this multilayer arrangement, the advantage of the thin ferromagnetic layers, as regards the speed of diffusion, is combined with that of the thick ferromagnetic layers, as regards the level of the read-out signal.

Finally, the bits 2 containing the ferromagnetic layers may be continuous or, preferably, discontinuous. When they are continuous, the magnetic transitions produced by the magnetic destructions, which constitute the information to be detected, are spread apart and the read-out signals are detected during advance of the memory element. This may produce weak read-out signals. However, during static read-out, i.e. for example with the aid of a magneto-resistor, this drawback is reduced. When the ferromagnetic layers are discontinuous, the magnetic transitions are always abrupt and readily detected.

BRIEF DESCRIPTION OF THE DRAWINGS

The invention will be more readily understood on reading the following description with reference to the accompanying drawings, in which.

Figure 1:
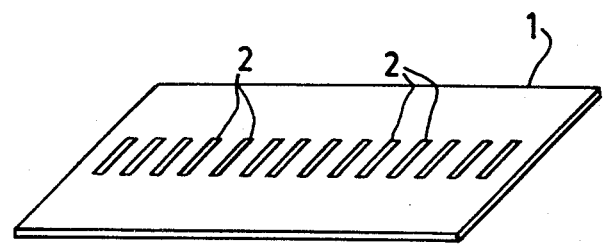
FIG. 1 shows a view in perspective from above of the memory element of the invention.

Referring now to the drawings, the element shown therein comprises a support 1, which is rigid or semirigid, and a series of deposits 2 of portions of ferromagnetic layers alternating with portions of diffuser layers in intimate contact with the ferromagnetic layers.

In the example shown, the support 1 has been cut out from a sheet of polyimide. The dimensions may correspond to those of a public transport ticket, a token for a public telephone, or a credit card. This support is coated with a layer 3 of copper, adapted to facilitate adhesion of the deposits or bits 2.

Figure 2:
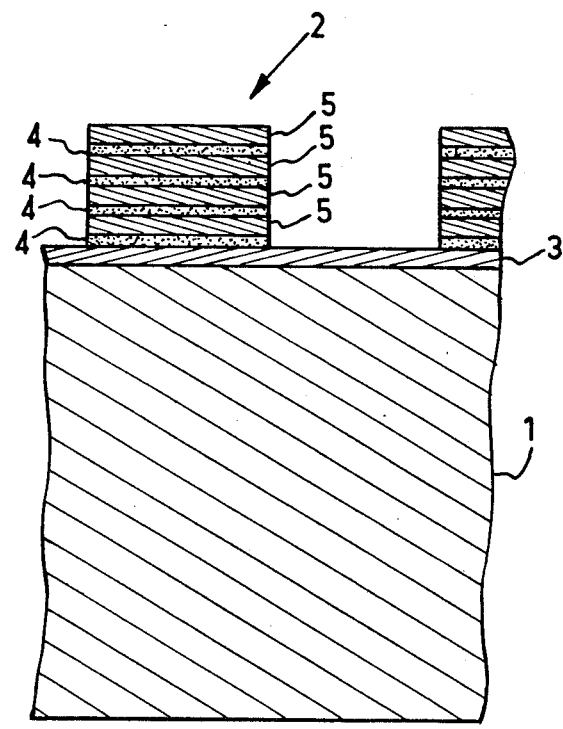
FIG. 2 shows a partial view in longitudinal section, to a much larger scale, of the element of FIG. 1.

The deposits or bits 2, made for example by evaporization in vacuo, chemical deposit without current or electrolytic deposit, are disposed on the support 1 transversely to the longitudinal axis thereof, with interposition of the layer of copper 3, and they are regularly spaced apart. About a hundred deposits or bits 2 may thus be provided in the length of the support, with a definition of one or two bits 2 per mm. Each deposit 2 comprises a plurality of alternating superposed thin ferromagnetic layers 4 and diffuser layers 5. In the case shown, the deposits 2 comprise four of each of these layers. The layer of copper 3 may equally well receive a ferromagnetic layer 4 (FIG. 2) or a diffuser layer 5. All of the portions of a layer at the same level form a discontinuous, ferromagnetic or diffuser layer.

The ferromagnetic layers 4 may be formed of ferromagnetic alloy containing nickel and cobalt in equal proportions. In the example in question, each of these layers has a thickness of 500 A.

The diffuser layers 5 may be formed of indium, with a thickness of 1000 A, constituting a good source of diffusion.

The magnetizable thickness of deposits 2 therefore reaches 2000 A, appropriate to obtain a good level of read-out signal, the arrangement of the ferromagnetic and diffuser materials in alternate multilayers simultaneously allowing a good diffusion.

The heat-destructible magnetic memory element described hereinabove constitutes an information support which may have a life of the order of 10,000 hours; the bits of information constituted by deposits 2 may be irreversibly erased one by one, during advance of the element in a read-out apparatus, by thermal means, such as heating resistor, radiations, high-frequency induction, Eddy currents or Joule effect. This is a support which cannot be fraudulently copied since the deposits 2 are no longer usable after a thermal erasure due to the irreversible destruction of the magnetism of the corresponding layers 4.

The memory element described hereinabove may be exploited used as follows:

The element is firstly inserted into a dynamic read-out device (not shown) comprising two magnets disposed head to tail upstream. The element is inserted between the two magnets of the dynamic read-out apparatus, to force in the same direction the magnetizations of all the portions of ferromagnetic layers 4 which were previously magnetized. The position of the first deposit 2, or bit, to be erased is then read-out or determined, and it is erased under the action of temperature, for example of the order of 300° C., and then it is re-read. If, in the course of this latter read-out, it is observed that this first bit has not in fact been erased, it is deduced that this is a token with information not destructible by heat, and is therefore a fraud. The advantage of orienting all the magnetizations in the same direction resides in that, in the case of an ordinary support with continuous ferromagnetic layers non-destructible by heat, no more magnetic transition and therefore no more information remains thereafter. With a support with continuous, but heat-destructible ferromagnetic layers, in which local magnetic predestructions were effected before any exploitation, the exploitation creating other destructions in any case, there still remain magnetic transitions, and therefore legible bits of information.

Once the validity of the support has been checked, the number of bits 2 corresponding to the credit consumed is erased by thermal means.

In order to reduce mechanical wear due to friction of the read-out head, the memory element of the invention may advantageously be coated with a silicon varnish or with a thin layer of Teflon, thus promoting the slide on the read-out head and resisting the temperature of erasure or destruction of the magnetism.

What is claimed is:

1. A magnetic memory element, comprising a support, at least one ferromagnetic layer on said support containing at least one piece of information recorded therein and at least one layer of a non-magnetic diffuser in contact with said ferromagnetic layer, each said diffuser layer being operable, when heated, to diffuse said non-magnetic diffuser from a said diffuser layer into a said ferromagnetic layer associated therewith and thus irreversibly destroy the magnetism of said associated ferromagnetic layer.

2. The element of claim 1, wherein said ferromagnetic layer is a thin layer.

3. The element of claim 1, wherein the concentration of said non-magnetic diffuser required for said irreversible destruction is less than the solubility of said non-magnetic diffuser in said ferromagnetic layer.

4. The element of claim 2, wherein the concentration of said non-magnetic diffuser required for said irreversible destruction is less than the solubility of said non-magnetic diffuser in said ferromagnetic layer.

5. The element of claim 2, wherein a plurality of said thin ferromagnetic layers are alternatingly superposed with a plurality of said diffuser layers.

6. The element of claim 3, wherein a plurality of said thin ferromagnetic layers are alternatingly superposed with a plurality of said diffuser layers.

7. The element of claim 1, wherein said ferromagnetic layers are discontinuous.

* * * * *